Figure 1:
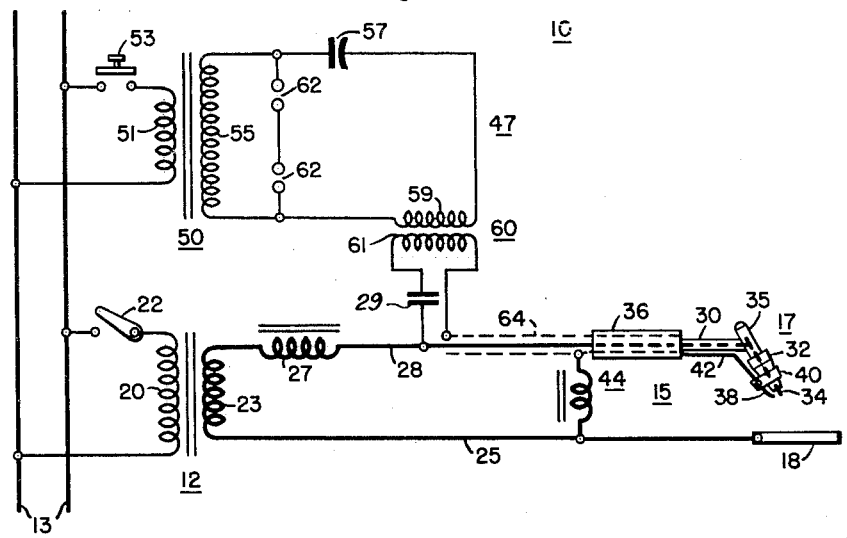

July 18, 1950     C. S. WILLIAMS     2,516,037

ARC WELDING APPARATUS

Filed Nov. 3, 1948

WITNESSES:
Robert C. Baird
G. V. Giolma

INVENTOR
Clifton S. Williams.
BY G. M. Crawford
ATTORNEY

Patented July 18, 1950

2,516,037

UNITED STATES PATENT OFFICE 2,516,037

ARC WELDING APPARATUS

Clifton S. Williams, Pittsburgh, Pa., assignor to Westinghouse Electric Corporation, East Pittsburgh, Pa., a corporation of Pennsylvania Application November 3, 1948, Serial No. 58,133

11 Claims. (Cl. 315—246)

My invention relates, generally, to arc welding apparatus and has reference in particular to the initiation of an arc in arc welding systems.

Generally stated, it is an object of my invention to provide an arc initiating system for arc welding systems which is simple and inexpensive to manufacture, and which is reliable and effective in operation.

More specifically, it is an object of my invention to provide, in an alternating current arc welding system, for using an auxiliary low frequency initiating arc in conjunction with the main welding electrode.

Another object of my invention is to provide, in an arc welding system, for supplying current to an auxiliary arc maintained between the main welding electrode and an auxiliary electrode from the same source as the welding current is obtained.

An important object of my invention is to provide, in a gaseous atmosphere alternating current arc welding system, for initiating an auxiliary low frequency arc between the main welding electrode and an auxiliary electrode without contaminating the metal of the main electrode.

Yet another object of my invention is to provide, in an alternating current arc welding system, for supplying a limited current of relatively low frequency to maintain an auxiliary arc between the main welding electrode and an auxiliary electrode only when the welding arc is extinguished.

Another important object of my invention is to provide, in a gaseous atmosphere arc welding system which has asymmetric arc impedance characteristics, for utilizing an auxiliary electrode in conjunction with the main welding electrode and for ionizing the gaseous atmosphere in the region between the welding and auxiliary electrodes to initiate an auxiliary low frequency arc therebetween.

It is also an object of my invention to provide, in an alternating current arc welding system, for initiating an arc with a minimum of radio interference by using an auxiliary arcing electrode mounted in arcing relation with the main welding electrode and for connecting it to ground through a current limiting device.

Other objects will, in part, be obvious and will, in part, be explained hereinafter.

In practicing my invention in one of its forms, a welding torch or holder having a tungsten main welding electrode is disposed to be supplied with welding current from a source of alternating current of relatively low frequency such as 60 cycles for maintaining an arc with a workpiece in an atmosphere of argon or helium, which is supplied to a nozzle surrounding the main electrode. An auxiliary electrode is mounted on the nozzle of the torch in arcing relation with the main welding electrode and is connected to ground or the workpiece through a current limiting reactor. An auxiliary power arc is initiated between the main and auxiliary electrodes, either by contact of the electrodes or by means of a high frequency voltage produced by a high frequency generator. The high frequency generator may be connected to the welding lead which supplies current to the main welding electrode and to the auxiliary electrode, and a metallic band around the nozzle by means of an auxiliary conductor. Either means provides for ionizing the stream of gas passing through the nozzle sufficiently to ignite a 60-cycle or other relatively low frequency arc between the main and auxiliary electrodes. This arc permits readily drawing an arc between the main welding electrode and the workpiece without requiring physical contact therebetween.

Figure 2:
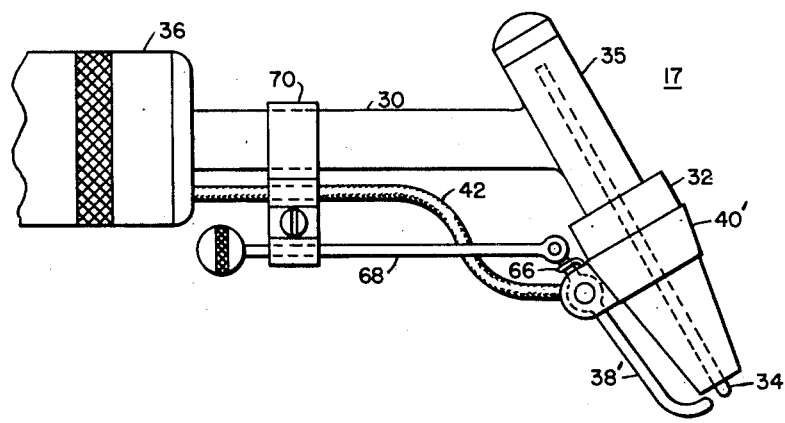

For a more complete understanding of the nature and scope of my invention, reference may be made to the following detailed description which may be read in connection with the accompanying drawing, in which:

Figure 1 is a diagrammatic view of an alternating current arc welding system embodying the invention in one of its forms; and Fig. 2 is an enlarged partial side elevational view of an electrode holder or torch similar to the one shown in Fig. 1, but embodying the invention in another of its forms.

Referring to Fig. 1, the reference numeral 10 may denote generally an arc welding system wherein a welding transformer 12 may be disposed to supply welding current from a relatively low frequency source, represented by the conductors 13, to an arc welding circuit 15 which may include an electrode holder or welding torch 17 and a workpiece 18 upon which a welding operation is to be performed.

The primary winding 20 of the welding transformer 12 may be connected to the conductors 13 through a switch 22. The secondary winding 23 may be connected to the workpiece 18 by means of a conductor 25 and to the welding torch 17 by means of a current limiting reactor 27 and conductor 28.

The welding torch 17 may be of any suitable type such as is well known in the art of gaseous atmosphere welding. The torch may, for example, comprise a stem portion 30 having a passage therethrough for supplying a gas, such as argon or helium, to a hollow nozzle 32 which surrounds the main welding electrode 34 positioned in head portion 35 of the torch. A handle 36 may be attached to the stem portion 30. The electrode 34 may be of either the consumable type, or the non-consumable type such as, for example, a tungsten electrode.

In order to provide for striking an arc between the main welding electrode 34 and the workpiece 18 without requiring contact of the main welding electrode 34 with any material which might contaminate it, means, such as an auxiliary electrode 38, may be provided. When the auxiliary electrode is to be used with a welding torch having a refractory nozzle 32, the auxiliary electrode may comprise a suitable length of tungsten wire, or the like, supported in fixed arcing relation with the main welding electrode 34 by means of a metal band or clamp 40 positioned around the outer surface of the nozzle.

The auxiliary electrode 38 may be connected by means of an auxiliary conductor 42 and a current limiting reactor 44 to the workpiece 18 and the ground conductor 25 so as to provide for impressing the voltage of the welding transformer 12 between the main and auxiliary electrodes whenever the welding arc is extinguished. The current limiting reactor 44 may be disposed to limit the maximum arc current between the main and auxiliary electrodes to a value on the order of 10 to 50 amperes.

In order to provide for initiating an auxiliary arc between the main and auxiliary electrodes, initiating means, such as a high frequency generator 47, may be utilized to supply an initial high frequency discharge. The high frequency generator 47 may be of any suitable type, comprising, for example, a step-up control transformer 50 having a primary winding 51 which may be connected to the source conductor 13 through a push-button control switch 53.

The secondary winding 55 of the control transformer may be connected in an oscillatory circuit including a capacitor 57 and the primary winding 59 of a coupling transformer 60 having a secondary winding 61. A pair of spark gaps 62 may be connected across the secondary winding 55 to provide for setting up oscillations in the secondary circuit.

The secondary winding 61 of the coupling transformer 60 may have one terminal connected to the welding lead 28 through a coupling capacitor 29, while the other terminal may be connected to the auxiliary electrode 38 and the metal band 40. The connection to the auxiliary electrode and the metal band may, for example, be made through a braided metallic shield positioned around the welding lead 28, and which is represented by the dotted lines 64.

When the switch 22 is closed to energize the welding transformer, the secondary voltage of the welding transformer appears between the main welding electrode 34 and the auxiliary electrode 38. By momentarily closing the push-button switch 53, a high frequency voltage may be applied to the auxiliary electrode and to the metal band 40 surrounding the refractory nozzle 32, so as to provide for ionizing the stream of gas passing through the nozzle.

Sufficient ionization may be thus produced to provide a high frequency discharge between the main and auxiliary electrodes, which will be followed by a low frequency auxiliary arc. The auxiliary arc current will be limited by the reactor 44 to a value of about 35 amperes, which has been found satisfactory when using a welding transformer having an open circuit secondary voltage on the order of 65 volts. This arc will produce sufficient ionization in the region of the main welding electrode 34 to permit an arc to be readily struck between the electrode 34 and the workpiece 18, without requiring contact therebetween.

As soon as an arc is struck between the main welding electrode and the workpiece, the voltage on the auxiliary electrode will be reduced to the value of the arc drop in the main welding arc, and the auxiliary arc will either be extinguished or merged in the main arc. As soon as the main arc is extinguished, the full voltage of the welding transformer will be immediately reapplied between the main and auxiliary electrodes so as to reignite the auxiliary arc which will then be available for restriking the main welding arc.

Referring to Fig. 2, it will be seen that in this instance the welding torch 17 may comprise, as hereinbefore described in connection with Fig. 1 of the drawing, a stem portion 30 having a head portion 35 at one end and a handle 36 mounted adjacent the other end. A nozzle is secured on the head portion 35 about the main or welding electrode 34 which may, for example, comprise a tungsten rod.

In order to provide for striking an auxiliary arc of relatively low frequency between the main welding electrode 34 and an auxiliary electrode 38', which corresponds to the fixed auxiliary electrode shown in Fig. 1, without using a high frequency voltage, the auxiliary electrode 38' may be pivotally mounted by means of a metal band or clamp 40' secured about the refractory nozzle 32. Biasing means, such as the spring 66, may be provided for normally biasing the auxiliary electrode 38' away from the main welding electrode 34 to a normal arcing position.

Actuating means, such as the pull rod 68, may be operatively connected to the upper end of the auxiliary electrode 38' for actuating the lower end or tip thereof into engagement with the tip of the main welding electrode 34. Clamp means 70 may be disposed on the stem portion 30 of the welding torch to slidably support the pull rod 38 in a position where it may be readily actuated by the operator. The auxiliary electrode 38' may be connected, as shown in Fig. 1, to the ground or return side of the welding transformer 23 through the reactor 44 and auxiliary conductor 42.

In operation, an auxiliary power arc may be readily struck between the auxiliary electrode 38' and the main welding electrode 34 by actuating the pull rod 68 to bring the lower end or tip of the electrode 38 into engagement with the tip of the welding electrode 34. Upon separation, a 60-cycle or other relatively low frequency power arc will be drawn between the main and auxiliary electrodes, the arc current being limited by the reactor 44. By making the auxiliary electrode 38' of the same material as the main welding electrode, no contamination of the main welding electrode results, and the arc characteristics of the torch will not therefore be adversely affected. As soon as the auxiliary arc is drawn between the main and auxiliary electrodes, the holder or torch 17 may be brought into welding position, and the welding arc may be readily struck between the main welding electrode 34 and the workpiece 18 without requiring actual contact therebetween.

From the above description and the accompanying drawing, it will be apparent that I have provided in a simple and effective manner for initiating an arc in an arc welding system. My invention may be utilized in direct current arc welding systems as well as in alternating current systems; is also advantageous in non-gaseous atmosphere as well as gaseous atmosphere systems; and may be used with relatively non-consumable electrodes as well as with consumable ones. By utilizing an auxiliary power or low frequency (generally 60-cycle) arc, in the manner hereinbefore described, initiation of the welding arc is readily effected. Initiation of the arc may be easily effected with a minimum of radio interference, since the high frequency current is required only momentarily, and the close proximity of the high frequency conductors minimizes the amount of high frequency radiation. By utilizing either a stationary auxiliary electrode with high frequency initiation, or a movable auxiliary electrode, initiation of the auxiliary arc may be effected without any possibility of contamination of the main welding electrode.

If desired, a welding torch or electrode holder having a stationary auxiliary electrode connected, as shown in Fig. 1 of the drawing, may be used in conjunction with a block of carbon or other suitable conducting material to draw an arc between the main and auxiliary electrodes, without requiring the carbon to be in contact with the work upon which the welding operation is to be performed. The torch may be then moved freely to strike the main arc without the auxiliary arc being extinguished. This method has decided advantages over the present known method of using a carbon block in electrical contact with the workpiece and drawing an arc between the carbon block and the main electrode and then transferring this arc to the workpiece to commence a welding operation. My invention also facilitates starting a welding operation, since the illumination provided by the auxiliary arc enables the operator to observe the work and electrodes without raising his welding hood or shield.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. In an arc welding system, a main electrode disposed to be connected in circuit relation with a single phase source of welding current and a workpiece for maintaining an arc with the workpiece, and an auxiliary electrode disposed in insulated relation with the main electrode and connected to the source of welding current through an impedance device to maintain an auxiliary arc between the main and auxiliary electrodes only until the arc is established between the main electrode and workpiece.

2. The combination with a welding transformer having a secondary winding, of a welding torch having a main electrode disposed to be connected in circuit relation with the secondary winding of the transformer and a workpiece upon which a welding operation is to be performed, an auxiliary electrode disposed in insulated relation with the main electrode, and circuit means including a current limiting impedance connecting the auxiliary electrode to the work side of the secondary winding of the welding transformer to limit the auxiliary arc current to a value insufficient to maintain said arc after an arc is established between the main electrode and workpiece.

3. The combination with a single phase source of welding current and a welding torch having a main electrode disposed to be connected in circuit relation with the source and work upon which a welding operation is to be performed, of an auxiliary electrode mounted in arcing relation with the main electrode, and circuit means connected to apply voltage from the single phase source between the main and auxiliary electrodes.

4. In combination with an alternating current transformer having a single phase secondary winding and a welding torch having a main electrode disposed to be connected in circuit relation with said winding of the transformer and a workpiece upon which a welding operation is to be performed, of an auxiliary electrode mounted on the torch in arcing relation to the main electrode, circuit means connected to apply a relatively low frequency voltage from said winding to maintain an auxiliary arc between the main and auxiliary electrodes only until a principal arc is established between the main electrode and workpiece, and a high frequency generator connected to apply a high frequency voltage between the main and auxiliary electrodes to initiate a relatively low frequency arc.

5. In an arc welding system, a welding torch having a main electrode, a welding transformer having a secondary winding disposed to be connected in circuit relation with the main electrode and a workpiece upon which a welding operation is to be performed, an auxiliary electrode disposed on the torch in arcing relation with the main electrode, and circuit means including an impedance device connected to apply a relatively low frequency alternating current voltage from said secondary winding between the main and auxiliary electrodes.

6. In an arc welding system, a welding torch having a main electrode and an auxiliary electrode disposed in arcing relation therewith, circuit means connecting the main electrode and a workpiece to a single phase source of welding current for maintaining a main arc between the main electrode and workpiece, and additional circuit means including a current limiting impedance connecting the auxiliary electrode to the workpiece for providing an initiating arc only until the main arc is established.

7. An arc welding system comprising, a holder having a main electrode and an auxiliary electrode in arcing relation therewith, a welding transformer having a secondary winding connected between the work and the main electrode, and limited current supply means connecting the auxiliary electrode and the work to provide a maximum auxiliary arc current from said secondary winding on the order of 30–50 amperes.

8. In an arc welding system, a holder having a main electrode and an auxiliary electrode disposed in arcing relation, a single phase welding transformer having a secondary winding disposed to connect the main electrode and a workpiece to a source of 60-cycle alternating current, a current limiting reactor connecting the auxiliary electrode to the work in circuit relation with the secondary winding and main electrode, and a high frequency generator connecting the main electrode and the auxiliary electrode.

9. A welding torch comprising, a handle having a main electrode for maintaining an arc with a workpiece, a refractory nozzle supported on the handle and surrounding the main electrode, and an auxiliary electrode pivotally supported on the nozzle in spaced relation with the main electrode for providing an initiating arc with the main electrode when connected in circuit relation with the main electrode and a source of arc initiating voltage.

10. An arc welding system comprising, a holder having main and auxiliary electrodes, a welding transformer having a single phase secondary winding, circuit means including a current limiting reactor connecting terminals of the secondary winding to the main electrode and to a workpiece to furnish current for welding, an auxiliary current limiting device connecting the auxiliary electrode to the workpiece terminal of the welding transformer in circuit with said secondary winding and main electrode, control means including a high frequency generator connected to the auxiliary electrode and the main electrode, and switch means operable to render the high frequency generator momentarily effective to initiate an arc between the main and auxiliary electrodes.

11. An arc welding system comprising, a welding torch having main and auxiliary tungsten electrodes, the main nozzle having a refractory nozzle disposed around it and said auxiliary electrode being pivotally mounted on the nozzle in arcing relation with the main electrode and disposed to engage it to draw an arc therebetween, a welding transformer having a secondary winding connected between the main electrode and work upon which a welding operation is to be performed to supply a single phase 60-cycle current to an arc therebetween, and a current limiting reactor connecting the auxiliary electrode to the work side of the welding transformer in circuit relation with the secondary winding and main electrode to supply a limited current to an arc between the main and auxiliary electrodes.

CLIFTON S. WILLIAMS.

REFERENCES CITED

The following references are of record in the file of this patent:

UNITED STATES PATENTS

| Number | Name | Date |
|---|---|---|
| 1,533,874 | Livermore | Apr. 14, 1925 |
| 1,610,920 | Bethenod | Dec. 14, 1926 |
| 1,708,003 | Weinman | Apr. 9, 1929 |
| 2,340,093 | White | Jan. 25, 1944 |
| 2,379,777 | Zeilstra | July 3, 1945 |
| 2,395,062 | Nielsen | Feb. 19, 1946 |
| 2,437,840 | Steward et al. | Mar. 16, 1948 |